(12) United States Patent
Wu et al.

(10) Patent No.: US 11,444,476 B1
(45) Date of Patent: Sep. 13, 2022

(54) LIGHTNING STRIKE PROBABILITY-BASED COORDINATED POWER CONTROL METHOD FOR ENERGY STORAGE SYSTEM AND LOAD

(71) Applicants: STATE GRID JIANGSU ELECTRIC POWER CO., LTD. SUZHOU BRANCH, Jiangsu (CN); Wuhan University, Hubei (CN)

(72) Inventors: Zhijian Wu, Jiangsu (CN); Chong Tong, Jiangsu (CN); Jian Xu, Hubei (CN); Tao Wang, Hubei (CN); Zhihao Fang, Jiangsu (CN); Yi Hong, Jiangsu (CN); Jinwen Mai, Jiangsu (CN); Min Xiang, Jiangsu (CN); Jiahuan Feng, Jiangsu (CN); Yang Xu, Jiangsu (CN); Qi Pan, Jiangsu (CN); Dongsheng Jing, Jiangsu (CN); Peng Wang, Jiangsu (CN); Weiliang Wang, Jiangsu (CN); Siyang Liao, Hubei (CN); Yongling Lu, Jiangsu (CN); Dan Wang, Jiangsu (CN); Junlin Su, Jiangsu (CN)

(73) Assignees: STATE GRID JIANGSU ELECTRIC POWER CO., LTD., Suzhou (CN); Wuhan University, Wuhan (CN)

(*) Notice: Subject to any disclaimer, the term of this patent is extended or adjusted under 35 U.S.C. 154(b) by 0 days.

(21) Appl. No.: 17/686,417

(22) Filed: Mar. 4, 2022

Related U.S. Application Data (63) Continuation of application No. PCT/CN2021/139905, filed on Dec. 21, 2021.

(30) Foreign Application Priority Data

Sep. 23, 2021 (CN) .......................... 202111112760.8

(51) Int. Cl.
| | | |
|---|---|---|
| H02J 3/00 | (2006.01) | |
| H05F 7/00 | (2006.01) | |
| H02J 7/00 | (2006.01) | |

(52) U.S. Cl.
CPC ............ H02J 7/007 (2013.01); H02J 7/0048 (2020.01); H02J 3/00 (2013.01); H02J 2203/10 (2020.01); H02J 2203/20 (2020.01)

(58) Field of Classification Search
CPC .. H02J 7/007; H02J 7/0048; H02J 7/00; H02J 3/00; H02J 2203/20; H02J 2203/10; H05F 7/00

(Continued)

(56) References Cited

U.S. PATENT DOCUMENTS

| | | | | |
|---|---|---|---|---|
| 5,825,162 A | * | 10/1998 | Kida | ...................... H02J 3/1807 323/210 |
| 2015/0222118 A1 | * | 8/2015 | Kogo | ...................... H02J 3/005 700/286 |

(Continued)

FOREIGN PATENT DOCUMENTS

| | | |
|---|---|---|
| CN | 110311377 B | 12/2020 |
| CN | 112467740 B | 5/2021 |

*Primary Examiner* — Richard Isla
*Assistant Examiner* — Dung V Bui

(57) ABSTRACT

A lightning strike probability-based coordinated power control method for an energy storage system and a load adjusts output power of an energy storage system and a regulatable load based on a real-time predicted lightning strike probability. This reduces a correlation between a power grid in a lightning region and an external power grid, minimizes impact of a lightning strike if any on the external power grid, and decreases an economic loss due to the lightning strike in the lightning region. The present disclosure establishes a relationship between the output power of the energy storage system, the regulated power of the regulatable load, and a lightning strike probability in a same region, and then (Continued)

regulates the power of the energy storage system and the regulatable load in real time based on the lightning strike probability.

18 Claims, 1 Drawing Sheet

(58) Field of Classification Search
USPC .......................................................... 320/135
See application file for complete search history.

(56) References Cited

U.S. PATENT DOCUMENTS

| 2018/0314220 A1* | 11/2018 | Kumar | G05B 15/02 |
| 2021/0066914 A1* | 3/2021 | Cai | H02J 3/0073 |
| 2022/0115867 A1* | 4/2022 | Ratnayake | H02J 3/06 |

\* cited by examiner

LIGHTNING STRIKE PROBABILITY-BASED COORDINATED POWER CONTROL METHOD FOR ENERGY STORAGE SYSTEM AND LOAD

CROSS REFERENCE TO RELATED APPLICATIONS

The present application is a Continuation Application of PCT Application No. PCT/CN2021/139905 filed on Dec. 21, 2021, which claims the benefit of Chinese Patent Application No. 202111112760.8 filed on Sep. 23, 2021. All the above are hereby incorporated by reference in their entirety.

TECHNICAL FIELD

The present disclosure relates to the technical field of dynamic lightning protection of a power system, and specifically, to a lightning strike probability-based coordinated power control method for an energy storage system and a load.

BACKGROUND

At present, in the lightning protection field of a power system, passive lightning protection measures are mainly adopted, for example, installing lightning rods and lightning wires. Although these measures can reduce a lightning strike risk, they aim at lightning protection of a single device and cannot give full play to an active regulation capability of the system. Traditional lightning protection measures cannot give full play to the initiative of the system. When there is a probability of striking a line by lightning, the system can only passively rely on a "lightning rod", a "lightning wire", and other devices, without any other active defense and control measures. Therefore, the traditional lightning protection measures are passive.

In recent years, dynamic lightning protection technologies have gradually developed. Prior art 1 (CN110311377B) discloses a method for source network load storage control and flexible load switching under a lightning climate, but does not provide a specific method for real-time power adjustment of an energy storage system and a load based on a lightning strike probability. Prior art 2 (CN112467740B) discloses a method for performing active lightning protection on an important transmission channel based on an early lightning warning, but the invention performs active lightning protection on the transmission channel through power flow transfer of the important transmission channel, and does not consider a regulation cost of the energy storage system or a power compensation cost of regulated power of a regulatable load to establish a relationship between output power of the energy storage system, the regulated power of the regulatable load, and a lightning strike probability in a same region. An energy storage device and the regulatable load are key objects of power flow adjustment, which can further improve active lightning protection of the system.

SUMMARY

To overcome the shortcomings in the prior art, the present disclosure is intended to provide a lightning strike probability-based coordinated power control method for an energy storage system and a load.

The present disclosure adopts the following technical solution.

A lightning strike probability-based coordinated power control method for an energy storage system and a load includes the following steps:

step 1: collecting a predicted lightning probability value for a current time interval $\Delta T$, and performing step 2 when the predicted lightning probability value $p_{lightning}$ is $>\mu_1$, where $\mu_1$ represents a minimum predicted lightning probability value at which an energy storage system and a load can perform power regulation, and the time interval $\Delta T$ represents a lightning probability prediction cycle, which is equivalent to a regulation cycle of the energy storage system and in units of hour;

step 2: determining a short-term scheduling cost loss of the energy storage system and a compensation cost function of regulated power of a regulatable load;

step 3: establishing a power control model of the energy storage system based on a lightning strike probability; and step 4: establishing a power control model of the regulatable load based on the lightning strike probability, adjusting the regulated power of the regulatable load, and then returning to step 1 to collect the predicted lightning probability value for a next time interval and perform coordinated power control on the energy storage system and the load.

In step 1, when the predicted lightning probability value $p_{lightning}$ is $\leq \mu_1$, it indicates that there is no lightning; when the predicted lightning probability value $p_{lightning}$ is greater than $\mu_1$ and less than $\mu_2$, it indicates that there is basically no lightning; when the predicted lightning probability value $p_{lightning}$ is equal to or greater than $\mu_2$ and less than $\mu_3$, it indicates that there may be lightning; when the predicted lightning probability value $p_{lightning}$ is $\geq \mu_3$, it indicates that there is lightning.

In step 2, the short-term scheduling cost loss of the energy storage system satisfies the following relational expression:

$$J_{bat} = \frac{CC_{bat} \times \Delta T \times P_{ba} \times \eta_c}{N_{cycle}} + CC_b \times P_{ba}^2 \times \Delta T$$

where $J_{bat}$ represents the short-term scheduling cost loss of the energy storage system, which is in units of Yuan; $CC_b$ represents a loss cost caused by a charging and discharging current, with a unit price of Yuan/(kW)² h; $N_{cycle}$ represents a quantity of cycles of the energy storage system, which is in units of times; $P_{ba}$ represents actual power of the energy storage system, which is in units of kW; $CC_{bat}$ represents an investment cost of the energy storage system, which is in units of Yuan/kWh; $\Delta T$ represents the lightning probability prediction cycle, which is equivalent to the regulation cycle of the energy storage system and in units of hour; and $\eta_c$ represents efficiency of the energy storage system.

In step 2, the compensation cost function of the regulated power of the regulatable load is expressed as follows:

$$\begin{cases} C_{k,t}^+ = a_k^+ (\Delta P_{k,t}^+)^2 + b_k^+ \Delta P_{k,t}^+ - b_k^+ \Delta P_{k,t}^+ \vartheta_k^+ \\ C_{k,t}^- = a_k^- (\Delta P_{k,t}^-)^2 + b_k^- \Delta P_{k,t}^- - b_k^- \Delta P_{k,t}^- \vartheta_k^- \end{cases}$$

where $C_{k,t}^+$ and $C_{k,t}^-$ respectively represent a compensation cost caused by increasing power of the regulatable load and a compensation cost caused by decreasing the power of the regulatable load, which are in units of Yuan;

$a_k^+$ represents a quadratic term coefficient of the compensation cost caused by increasing the power of the regulatable load;

$b_k^+$ represents a single term coefficient of the compensation cost caused by increasing the power of the regulatable load;

$a_k^-$ represents a quadratic term coefficient of the compensation cost caused by decreasing the power of the regulatable load;

$b_k^-$ represents a single term coefficient of the compensation cost caused by decreasing the power of the regulatable load;

$\vartheta_k^+$ and $\vartheta_k^-$ respectively represent parameters indicating willingness of a user for load adjustment when the power of the regulatable load is increased and decreased, both are greater than 0 and less than 1, and a greater value leads to stronger willingness of the user for increasing or reducing the power of the load; for an industry or a user who has no demand for regulation of the power of the load of the system, values of $\vartheta_k^+$ and $\vartheta_k^-$ are 0; for an industry using an electrolytic aluminum load, because a load power regulation capacity of the industry is greater than that of a common industry, the values of $\vartheta_k^+$ and $\vartheta_k^-$ are 0.5; and for another industry or user who can regulate load power at any time, the values of $\vartheta_k^+$ and $\vartheta_k^-$ are greater than 0.5 and less than 1; and $\Delta P_{k,t}^+$ and $\Delta P_{k,t}^-$ respectively represent power variations when the power of the regulatable load is increased and decreased.

Step 3 includes the following substeps:

step 3.1: determining a possible loss of the system due to a lightning strike when power regulation of the energy storage system is not considered;

step 3.2: determining a power loss of the system due to the lightning strike after the energy storage system preforms power regulation;

step 3.3: determining optimal output power $P^*_{ba}$ of the energy storage system; and step 3.4: adjusting output power of the energy storage system based on an operation constraint of the energy storage system.

In step 3.1, the possible loss of the system due to the lightning strike when power regulation of the energy storage system is not considered satisfies the following relational expression:

$$Y_1 = P_{load} \times \text{price} \times p_{lightning} \times \Delta T$$

where $P_{load}$ represents a power loss caused to the load by the lightning strike, which is in units of kW; and price represents a unit price of a lost electric quantity, which is in units of Yuan/kWh.

In step 3.2, the power loss of the energy storage system due to the lightning strike after the energy storage system preforms power regulation satisfies the following relational expression:

$$Y_2 = (P_{load} - P_{ba}) \times \text{price} \times p_{lightning} \times \Delta T + J_{bat}$$

$$(P_{load} - P_{ba}) \times \text{price} \times p_{lightning} \times \Delta T + \frac{CC_{bat} \times \eta_c \times \Delta T \times P_{ba}}{N_{cycle}} +$$

$$CC_b \times \Delta T \times (P_{ba})^2$$

where $P_{ba}$ represents the output power of the energy storage system, which is in units of kW; and price represents the unit price of the lost electric quantity, which is in units of Yuan/kWh.

In step 3.3, a difference between the loss when the energy storage system does not perform power regulation and the loss after the energy storage system performs power regulation satisfies the following relational expression:

$$\Delta Y = Y_2 - Y_1 = $$
$$CC_b \times \Delta T \times (P_{ba})^2 + \left(\frac{CC_{bat} \times \eta_c \times \Delta T}{N_{cycle}} - \text{price} \times p_{lightning} \times \Delta T\right) \times P_{ba}$$

When $\Delta Y$ is a minimum value, the optimal output power of the energy storage system is $P^*_{ba}$. Based on the difference $\Delta Y$ between the loss when the energy storage system does not perform power regulation and the loss after the energy storage system performs power regulation, it is determined that the obtained optimal output power of the energy storage system is $P^*_{ba}$ and satisfies the following relational expression:

$$P^*_{ba} = \frac{\text{price} \times p_{lightning} \times \Delta T \times N_{cycle} - CC_{ba} \times \eta_c \times \Delta T}{2 \times CC_b \times \Delta T \times N_{cycle}}$$

In step 3.4, the operation constraint of the energy storage system is as follows:

$$\begin{cases} SOC_{min} \le SOC(t) \le SOC_{max} \\ P_{ba\,min} \le P_{ba} \le P_{ba\,max} \end{cases}$$

where $SOC_{min}$ and $SOC_{max}$ respectively represent minimum and maximum allowable states of charge for operation of the energy storage system; $SOC(t)$ represents an actual state of charge of the energy storage system; $P_{bamin}$ and $P_{bamax}$ respectively represent minimum and maximum allowable power for operation of the energy storage system, $P_{bamin} < 0$, and $P_{bamax} > 0$; and $P_{ba}$ represents the actual power of the energy storage system; and after the above constraint is considered, a method for adjusting the output power of the energy storage system is as follows:

$$P_{ba} = \begin{cases} P^*_{ba} & (SOC_{min} \le SOC(t)) \& (P^*_{ba} \le P_{ba\,max}) \\ 0 & SOC(t) \le SOC_{min} \\ P_{ba\,max} & P^*_{ba} \ge P_{ba\,max} \end{cases}$$

Step 4 includes the following substeps:

step 4.1: determining a possible loss of the system due to the lightning strike when the energy storage system participates in power regulation and the load does not perform power regulation;

step 4.2: determining a possible loss of the energy storage system due to the lightning strike after both the energy storage system and the regulatable load preform power regulation;

step 4.3: determining an optimal power regulation amount $\Delta P^*_l$ of the load; and step 4.4: regulating the regulated power of the regulatable load.

In step 4.1, the possible loss of the system due to the lightning strike when the energy storage system participates in power regulation and the load does not perform power regulation satisfies the following relational expression:

$$X_1 = (P_{load} - P^*_{ba}) \times \text{price} \times p_{lightning} \times \Delta T$$

where $P_{load}$ represents the power loss caused to the load by the lightning strike, which is in units of kW; price represents the unit price of the lost electric quantity, which is in units of Yuan/kWh; and $P^*_{ba}$ represents the optimal output power of the energy storage system.

In step 4.2, the possible loss of the energy storage system due to the lightning strike after both the energy storage system and the regulatable load preform power regulation satisfies the following relational expression:

$$X_2 = (P_{load} - P^*_{ba} - \Delta P_l) \times \text{price} \times p_{lightning} \times \Delta T + a_k^-(\Delta P_l)^2 + b_k^- \Delta P_l - b_k^- \Delta P_l \vartheta_k^-,$$

where $\Delta P_l$ represents a power regulation amount of the load.

In step 4.3, a function of a difference between the possible loss due to the lightning strike when the regulatable load does not perform regulation and the possible loss due to the lightning strike after the regulatable load performs regulation satisfies the following relational expression:

$$\Delta X = X_2 - X_1 = a_k^-(\Delta P_l)^2 + (b_k^- - b_k^- \vartheta_k^- - \text{price} \times p_{lightning} \times \Delta T) \Delta P_l$$

where $a_k^-$ represents the quadratic term coefficient of the compensation cost caused by decreasing the power of the regulatable load;

$b_k^-$ represents the single term coefficient of the compensation cost caused by decreasing the power of the regulatable load; and $\vartheta_k^-$ represents the parameter indicating the willingness of the user for load adjustment when the power of the regulatable load is decreased; and based on the function of the difference between the possible loss due to the lightning strike when the regulatable load does not perform regulation and the possible loss due to the lightning strike after the regulatable load performs regulation, the optimal power regulation amount $\Delta P^*_l$ of the load can be obtained and is expressed as follows:

$$\Delta P_l^* = \frac{b_k^- \vartheta_k^- + \text{price} \times p_{lightning} \times \Delta T - b_k^-}{2 a_k^-}.$$

In step 4.4, a method for regulating the regulated power of the regulatable load is as follows:

setting a maximum power regulation amount of the load to $\Delta P_{lmax}$; and if $\Delta P^*_l \leq \Delta P_{lmax}$, determining that the regulated power of the regulatable load is $\Delta P^*_l$; or if $\Delta P^*_l > \Delta P_{lmax}$, determining that the regulated power of the regulatable load is $\Delta P_{lmax}$.

When there is a lightning strike risk, the present disclosure has the following beneficial effects compared with the prior art:

1. The present disclosure can regulate the power of the energy storage apparatus and the regulatable load, participate in system adjustment, and further improve active lightning protection of the system.

2. The present disclosure establishes a relationship between the power of the energy storage system and the regulatable load and the lightning strike probability under a lightning condition, and then can regulate the power of the energy storage and the load in real time based on the lightning strike probability, thereby improving an active defense capability of the system under the lightning condition, and minimizing impact of the lightning strike on a power grid in a non-lightning region and a possible loss in a lightning region.

3. On a basis of considering the regulation cost of the energy storage system and the compensation cost of the regulated power of the regulatable load, the present disclosure further establishes a relationship between the output power of the energy storage system, the regulated power of the regulatable load, and a lightning strike probability in a same region, and then regulates the power of the energy storage system and the regulatable load in real time based on the lightning strike probability, which reduces a correlation between the power grid in the lightning region and an external power grid, and is conducive to reducing a damage caused by the lightning strike to the system.

DETAILED DESCRIPTION

The present disclosure is further described below with reference to the accompanying drawings. The following embodiments are only used for describing the technical solutions of the present disclosure more clearly, and are not intended to limit the protection scope of the present disclosure.

Figure 1:
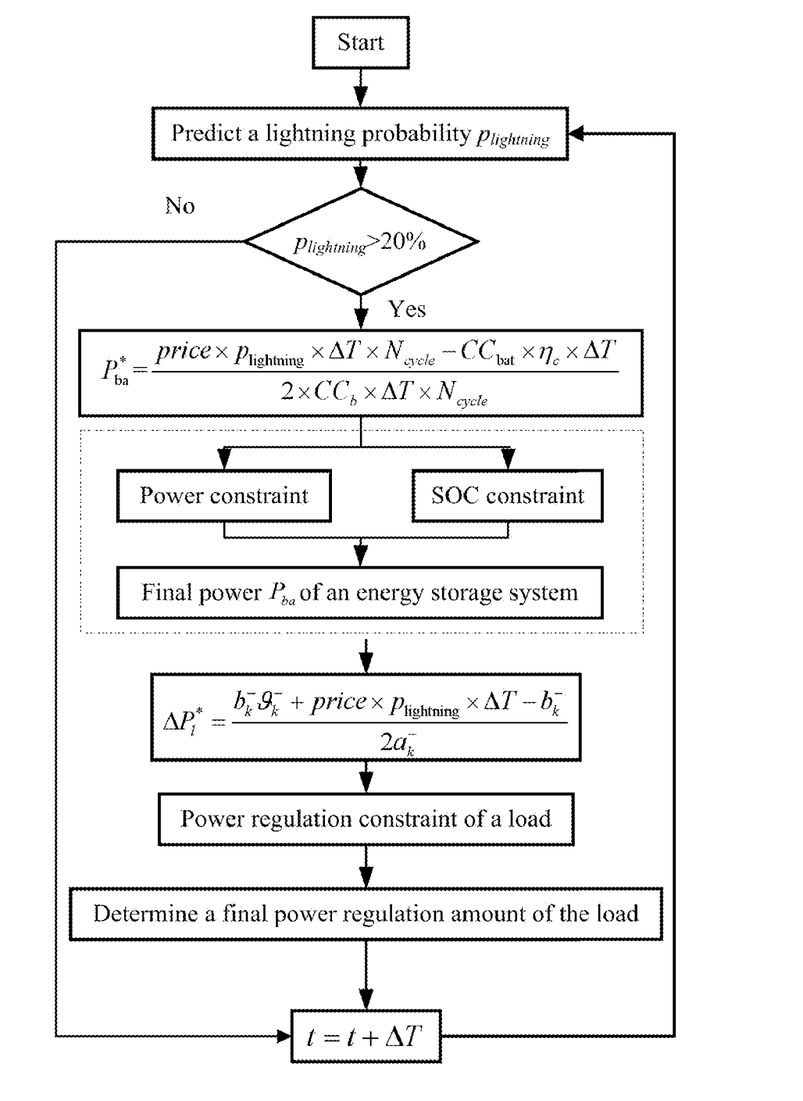
The sole FIGURE is a flowchart of a lightning strike probability-based coordinated power control method for an energy storage system and a load according to the present disclosure.

The sole FIGURE is a flowchart of a lightning strike probability-based coordinated power control method for an energy storage system and a load according to the present disclosure. The method specifically includes the following content.

Step 1: Collect a predicted lightning probability value $p_{lightning}$ for a current time interval $\Delta T$, and perform step 2 when $p_{lightning} > \mu_1$, where $\mu_1$ represents a minimum predicted lightning probability value at which an energy storage system and a load can perform power regulation.

The time interval $\Delta T$ represents a lightning probability prediction cycle, which is equivalent to a regulation cycle of the energy storage system and in units of hour.

When the predicted lightning probability value $p_{lightning}$ is $\leq \mu_1$, it indicates that there is no lightning; when the predicted lightning probability value $p_{lightning}$ is greater than $\mu_1$ and less than $P_2$, it indicates that there is basically no lightning; when the predicted lightning probability value $p_{lightning}$ is equal to or greater than $\mu_2$ and less than $\mu_3$, it indicates that there may be lightning; when the predicted lightning probability value $p_{lightning}$ is $\geq \mu_3$, it indicates that there is lightning. Preferably, $\mu_1$ is 20%, $\mu_2$ is 50%, and $\mu_3$ is 70%.

Step 2: Determine a short-term scheduling cost loss of the energy storage system and a compensation cost function of regulated power of a regulatable load.

A regulation cost of the energy storage system depends on a quantity of cycles of the energy storage system. In addition, a discharging current also increases internal resistance of a battery. Based on the above two aspects, the short-term scheduling cost loss of the energy storage system can be determined according to the following formula:

$$J_{bat} = \frac{CC_{bat} \times \Delta T \times P_{ba} \times \eta_c}{N_{cycle}} + CC_b \times P_{ba}^2 \times \Delta T$$

In the above formula, $J_{bat}$ represents the short-term scheduling cost loss of the energy storage system, which is in units of Yuan; $CC_b$ represents a loss cost caused by a charging and discharging current, with a unit price of Yuan/(kW)² h; $N_{cycle}$ represents the quantity of cycles of the energy storage system, which is in units of times; $P_{ba}$ represents actual power of the energy storage system, which is in units of kW; $CC_{bat}$ represents an investment cost of the energy storage system, which is in units of Yuan/kWh; $\Delta T$ represents the lightning probability prediction cycle, which is equivalent to the regulation cycle of the energy storage system and in units of hour; and $\eta_c$ represents efficiency of the energy storage system.

The compensation cost function of the regulated power of the regulatable load satisfies the following relational expression:

The compensation cost function of the regulated power of the regulatable load is expressed as follows:

$$\begin{cases} C_{k,t}^+ = a_k^+ (\Delta P_{k,t}^+)^2 + b_k^+ \Delta P_{k,t}^+ - b_k^+ \Delta P_{k,t}^+ \vartheta_k^+ \\ C_{k,t}^- = a_k^- (\Delta P_{k,t}^-)^2 + b_k^- \Delta P_{k,t}^- - b_k^- \Delta P_{k,t}^- \vartheta_k^- \end{cases}.$$

In the above function, $C_{k,t}^+$ and $C_{k,t}^-$ respectively represent a compensation cost caused by increasing power of the regulatable load and a compensation cost caused by decreasing the power of the regulatable load, which are in units of Yuan;

$a_k^+$ represents a quadratic term coefficient of the compensation cost caused by increasing the power of the regulatable load;

$b_k^+$ represents a single term coefficient of the compensation cost caused by increasing the power of the regulatable load;

$a_k^-$ represents a quadratic term coefficient of the compensation cost caused by decreasing the power of the regulatable load;

$b_k^-$ represents a single term coefficient of the compensation cost caused by decreasing the power of the regulatable load;

$\vartheta_k^+$ and $\vartheta_k^-$ respectively represent parameters indicating willingness of a user for load adjustment when the power of the regulatable load is increased and decreased, both are greater than 0 and less than 1, and a greater value leads to stronger willingness of the user for increasing or reducing the power of the load;

those skilled in the art may set the willingness parameters based on actual industry characteristics, user characteristics and user load characteristics, where for an industry or a user who has no demand for power regulation of the system and the load, values of $\vartheta_k^+$ and $\vartheta_k^-$ are 0; for an industry such as a steelwork, the power of the regulatable load is generally not regulated based on system scheduling; for an industry using an electrolytic aluminum load, because a load power regulation capacity of the industry is greater than that of a common industry, the values of $\vartheta_k^+$ and $\vartheta_k^-$ are 0.5; for another industry or user who can regulate load power at any time, the values of $\vartheta_k^+$ and $\vartheta_k^-$ are greater than 0.5 and less than 1; and in this embodiment, the values of $\vartheta_k^+$ and $\vartheta_k^-$ are 0.8 for rural residents because level-3 loads are basically used for the rural residents, and short-term power outage can be carried out; and $\Delta P_{k,t}^+$ and $\Delta P_{k,t}^-$ respectively represent power variations when the power of the regulatable load is increased and decreased.

Step 3: Establish a power control model of the energy storage system based on a lightning strike probability.

In order to ensure user satisfaction in electricity use, an energy storage device is preferentially used for power regulation to bear partial load power in a region with a lightning probability.

Step 3.1: Determine a possible loss of the system due to a lightning strike when power regulation of the energy storage system is not considered.

When the energy storage system does not participate in regulation, the possible loss due to the lightning strike is as follows:

$$Y_1 = P_{load} \times \text{price} \times p_{lightning} \times \Delta T$$

In the above formula, $P_{load}$ represents a power loss caused to the load by the lightning strike, which is in units of kW; price represents a unit price of a lost electric quantity, which is in units of Yuan/kWh; and $p_{lightning}$ represents the lightning strike probability.

Step 3.2: Determine a possible power loss of the system due to the lightning strike after the energy storage system preforms power regulation.

After the energy storage system performs power regulation, the energy storage system bears partial power, and in this case, the possible loss due to the lightning strike is as follows:

$$Y_2 = (P_{load} - P_{ba}) \times \text{price} \times p_{lightning} \times \Delta T + J_{bat}$$

$$(P_{load} - P_{ba}) \times \text{price} \times p_{lightning} \times \Delta T +$$

$$\frac{CC_{bat} \times \eta_c \times \Delta T \times P_{ba}}{N_{cycle}} + CC_b \times \Delta T \times (P_{ba})^2$$

In the above formula, $P_{ba}$ represents output power of the energy storage system, which is in units of kW; and price represents the unit price of the lost electric quantity, which is in units of Yuan/kWh.

Step 3.3: Determine optimal output power $P^*_{ba}$ of the energy storage system.

An expected difference between the loss when the energy storage system does not perform power regulation and the loss after the energy storage system performs power regulation satisfies the following relational expression:

$$\Delta Y = Y_2 - Y_1 =$$

$$CC_b \times \Delta T \times (P_{ba})^2 + \left( \frac{CC_{bat} \times \eta_c \times \Delta T}{N_{cycle}} - \text{price} \times p_{lightning} \times \Delta T \right) \times P_{ba}$$

Apparently, when $\Delta Y<0$, in other words, when $\Delta Y$ is a minimum value and a reduced loss is a maximum value, the optimal output power of the energy storage system is $P^*_{ba}$ and can be determined based on the expected difference $\Delta Y$ between the loss when the energy storage system does not perform power regulation and the loss after the energy storage system performs power regulation, which satisfies the following relational expression:

$$P^*_{ba} = \frac{\text{price} \times p_{lightning} \times \Delta T \times N_{cycle} - CC_{ba} \times \eta_c \times \Delta T}{2 \times CC_b \times \Delta T \times N_{cycle}}$$

Step 3.4: Adjust the output power of the energy storage system based on an operation constraint of the energy storage system.

$$\begin{cases} SOC_{min} \leq SOC(t) \leq SOC_{max} \\ P_{bamin} \leq P_{ba} \leq P_{bamax} \end{cases}$$

In the above operation constraint of the energy storage system, $SOC_{min}$ and $SOC_{max}$ respectively represent minimum and maximum allowable states of charge for operation of the energy storage system; $SOC(t)$ represents an actual state of charge of the energy storage system; $P_{bamin}$ and $P_{bamax}$ respectively represent minimum and maximum allowable power for operation of the energy storage system, $P_{bamin}<0$, and $P_{bamax}>0$; and $P_{ba}$ represents the actual power of the energy storage system, and in this specification, $P_{ba}>0$ because discharging is needed.

After the above constraint is considered, the output power of the energy storage system can be obtained according to the following formula:

$$P_{ba} = \begin{cases} P_{ba}^* & (SOC_{min} \leq SOC(t)) \& (P_{ba}^* \leq P_{bamax}) \\ 0 & SOC(t) \leq SOC_{min} \\ P_{bamax} & P_{ba}^* \geq P_{bamax} \end{cases}$$

Step 4: Establish a power control model of the regulatable load based on the lightning strike probability, adjust the regulated power of the regulatable load, and then return to step 1 to collect the predicted lightning probability value for a next time interval and perform coordinated power control on the energy storage system and the load.

As a virtual energy storage system, the regulatable load can also have an effect similar to an effect of the energy storage system. On a premise that the energy storage system participates in regulation, the load power can also be regulated to further improve the initiative of the system, reduce a correlation between a region with the lightning probability and an external power grid, and reduce a possible loss caused by lightning.

Step 4.1: Determine a possible loss of the system due to the lightning strike when the energy storage system participates in power regulation and the load does not perform power regulation.

When the battery participates in regulation and the load does not participate in regulation, the power loss due to the lightning strike can be determined according to the following formula:

$$X_1 = (P_{load} - P_{ba}^*) \times \text{price} \times p_{lightning} \times \Delta T$$

Step 4.2: Determine a possible loss of the system due to the lightning strike after both the energy storage system and the regulatable load preform power regulation.

After the load participates in regulation, the possible loss due to the lightning strike can be calculated according to the following formula:

$$X_2 = (P_{load} - P_{ba}^* - \Delta P_l) \times \text{price} \times p_{lightning} \times \Delta T + a_k^-(\Delta P_l)^2 + b_k^- \Delta P_l - b_k^- \Delta P_l \vartheta_k^-,$$

In the above formula, $\Delta P_l$ represents a power regulation amount of the load.

Step 4.3: Determine an optimal power regulation amount $\Delta P_l^*$ of the load.

A function of a difference between the possible loss due to the lightning strike when the regulatable load does not perform regulation and the possible loss due to the lightning strike after the regulatable load performs regulation can be expressed as follows:

$$\Delta X = X_2 - X_1 = a_k^-(\Delta P_l)^2 + (b_k^- - b_k^- \vartheta_k^- - \text{price} \times p_{lightning} \times \Delta T) \Delta P_l$$

In the above expression, $a_k^-$ represents the quadratic term coefficient of the compensation cost caused by decreasing the power of the regulatable load;

$b_k^-$ represents the single term coefficient of the compensation cost caused by decreasing the power of the regulatable load; and $\vartheta_k^-$ represents the parameter indicating the willingness of the user for load adjustment when the power of the regulatable load is decreased.

Apparently, based on the function of the difference between the possible loss due to the lightning strike when the regulatable load does not perform regulation and the possible loss due to the lightning strike after the regulatable load performs regulation, the optimal power regulation amount of the load can be obtained, and may be expressed as follows:

$$\Delta P_l^* = \frac{b_k^- \vartheta_k^- + \text{price} \times p_{lightning} \times \Delta T - b_k^-}{2 a_k^-}$$

In this case, after the regulatable load participates in regulation, the possible loss caused by lightning can be further reduced.

Step 4.4: Adjust the regulated power of the regulatable load based on a power regulation threshold of the load.

A maximum power regulation amount of the load is $\Delta P_{lmax}$. if $\Delta P_l^* \leq \Delta P_{lmax}$, the regulated power of the regulatable load is $\Delta P_l^*$; if $\Delta P_l^* > \Delta P_{lmax}$, the regulated power of the regulatable load is $\Delta P_{lmax}$.

In this case, optimal regulated power of the regulatable load can be determined.

After the current regulation cycle, a next regulation cycle is followed, and time t correspondingly increases by $\Delta T$.

The applicant of the present disclosure has made a detailed description of the implementation examples of the present disclosure with reference to the accompanying drawings in the specification. However, those skilled in the art should understand that the above implementation examples are only preferred implementation solutions of the present disclosure, and the detailed description is only to help readers better understand the spirit of the present disclosure, rather than to limit the protection scope of the present disclosure. On the contrary, any improvement or modification based on the spirit of the present disclosure shall fall within the protection scope of the present disclosure.

The invention claimed is:

1. A lightning strike probability-based coordinated power control method for an energy storage system and a load, wherein the method comprises:
step 1: collecting a predicted lightning probability value for a current time interval $\Delta T$, and performing step 2 when the predicted lightning probability value $p_{lightning}$ is $> \mu_1$, wherein $\mu_1$ represents a minimum predicted lightning probability value at which an energy storage system and a load can perform power regulation, and the time interval $\Delta T$ represents a lightning probability prediction cycle, which is equivalent to a regulation cycle of the energy storage system and in units of hour;

step 2: determining a short-term scheduling cost loss of the energy storage system and a compensation cost function of regulated power of a regulatable load;

step 3: establishing a power control model of the energy storage system based on a lightning strike probability; and step 4: establishing a power control model of the regulatable load based on the lightning strike probability, adjusting the regulated power of the regulatable load, and then returning to step 1 to collect the predicted lightning probability value for a next time interval and perform coordinated power control on the energy storage system and the load.

2. The lightning strike probability-based coordinated power control method for the energy storage system and the load according to claim 1, wherein in step 2, the short-term scheduling cost loss of the energy storage system satisfies the following relational expression:

$$J_{bat} = \frac{CC_{bat} \times \Delta T \times P_{ba} \times \eta_c}{N_{cycle}} + CC_b \times P_{ba}^2 \times \Delta T$$

wherein $J_{bat}$ represents the short-term scheduling cost loss of the energy storage system, which is in units of Yuan; $CC_b$ represents a loss cost caused by a charging and discharging current, with a unit price of Yuan/(kW)² h; $N_{cycle}$ represents a quantity of cycles of the energy storage system, which is in units of times; $P_{ba}$ represents actual power of the energy storage system, which is in units of kW; $CC_{bat}$ represents an investment cost of the energy storage system, which is in units of Yuan/kWh; $\Delta T$ represents the lightning probability prediction cycle, which is equivalent to the regulation cycle of the energy storage system and in units of hour; and $\eta_c$ represents efficiency of the energy storage system.

3. The lightning strike probability-based coordinated power control method for the energy storage system and the load according to claim 2, wherein in step 2, the compensation cost function of the regulated power of the regulatable load is expressed as follows:

$$\begin{cases} C_{k,t}^+ = a_k^+ (\Delta P_{k,t}^+)^2 + b_k^+ \Delta P_{k,t}^+ - b_k^+ \Delta P_{k,t}^+ \vartheta_k^+ \\ C_{k,t}^- = a_k^- (\Delta P_{k,t}^-)^2 + b_k^- \Delta P_{k,t}^- - b_k^- \Delta P_{k,t}^- \vartheta_k^- \end{cases}$$

wherein $C_{k,t}^+$ and $C_{k,t}^-$ respectively represent a compensation cost caused by increasing power of the regulatable load and a compensation cost caused by decreasing the power of the regulatable load, which are in units of Yuan;

$a_k^+$ represents a quadratic term coefficient of the compensation cost caused by increasing the power of the regulatable load;

$b_k^+$ represents a single term coefficient of the compensation cost caused by increasing the power of the regulatable load;

$a_k^-$ represents a quadratic term coefficient of the compensation cost caused by decreasing the power of the regulatable load;

$b_k^-$ represents a single term coefficient of the compensation cost caused by decreasing the power of the regulatable load;

$\vartheta_k^+$ and $\vartheta_k^-$ respectively represent parameters indicating willingness of a user for load adjustment when the power of the regulatable load is increased and decreased, both are greater than 0 and less than 1, and a greater value leads to stronger willingness of the user for increasing or reducing the power of the load; and $\Delta P_{k,t}^+$ and $\Delta P_{k,t}^-$ respectively represent power variations when the power of the regulatable load is increased and decreased.

4. The lightning strike probability-based coordinated power control method for the energy storage system and the load according to claim 3, wherein step 3 comprises the following substeps:

step 3.1: determining a possible loss of the system due to a lightning strike when power regulation of the energy storage system is not considered;

step 3.2: determining a power loss of the system due to the lightning strike after the energy storage system preforms power regulation;

step 3.3: determining optimal output power $P^*_{ba}$ of the energy storage system; and step 3.4: adjusting output power of the energy storage system based on an operation constraint of the energy storage system.

5. The lightning strike probability-based coordinated power control method for the energy storage system and the load according to claim 4, wherein in step 3.1, the possible loss of the system due to the lightning strike when power regulation of the energy storage system is not considered satisfies the following relational expression:

$$Y_1 = P_{load} \times \text{price} \times p_{lightning} \times \Delta T$$

wherein $P_{load}$ represents a power loss caused to the load by the lightning strike, which is in units of kW; and price represents a unit price of a lost electric quantity, which is in units of Yuan/kWh.

6. The lightning strike probability-based coordinated power control method for the energy storage system and the load according to claim 5, wherein in step 3.2, the power loss of the energy storage system due to the lightning strike after the energy storage system preforms power regulation satisfies the following relational expression:

$$Y_2 = (P_{load} - P_{ba}) \times \text{price} \times p_{lightning} \times \Delta T + J_{bat}$$

$$(P_{load} - P_{ba}) \times \text{price} \times p_{lightning} \times \Delta T +$$
$$\frac{CC_{bat} \times \eta_c \times \Delta T \times P_{ba}}{N_{cycle}} + CC_b \times \Delta T \times (P_{ba})^2$$

wherein $P_{ba}$ represents the output power of the energy storage system, which is in units of kW; and price represents the unit price of the lost electric quantity, which is in units of Yuan/kWh.

7. The lightning strike probability-based coordinated power control method for the energy storage system and the load according to claim 6, wherein in step 3.3, a difference between the loss when the energy storage system does not perform power regulation and the loss after the energy storage system performs power regulation satisfies the following relational expression:

$$\Delta Y = Y_2 - Y_1 =$$

$$CC_b \times \Delta T \times (P_{ba})^2 + \left(\frac{CC_{bat} \times \eta_c \times \Delta T}{N_{cycle}} - \text{price} \times p_{lightning} \times \Delta T\right) \times P_{ba}$$

based on the difference ΔY between the loss when the energy storage system does not perform power regulation and the loss after the energy storage system performs power regulation, it is determined that the obtained optimal output power of the energy storage system is P*$_{ba}$ and satisfies the following relational expression:

$$P_{ba}^* = \frac{\text{price} \times p_{lightning} \times \Delta T \times N_{cycle} - CC_{ba} \times \eta_c \times \Delta T}{2 \times CC_b \times \Delta T \times N_{cycle}}$$

in other words, when ΔY is a minimum value, the optimal output power of the energy storage system is P*$_{ba}$.

8. The lightning strike probability-based coordinated power control method for the energy storage system and the load according to claim 7, wherein
in step 3.4, based on the operation constraint of the energy storage system, the output power of the energy storage system is adjusted as follows:

$$P_{ba} = \begin{cases} P_{ba}^* & (SOC_{min} \leq SOC(t)) \,\&\, (P_{ba}^* \leq P_{bamax}) \\ 0 & SOC(t) \leq SOC_{min} \\ P_{bamax} & P_{ba}^* \geq P_{bamax} \end{cases}$$

wherein the operation constraint of the energy storage system is as follows:

$$\begin{cases} SOC_{min} \leq SOC(t) \leq SOC_{max} \\ P_{bamin} \leq P_{ba} \leq P_{bamax} \end{cases}$$

wherein $SOC_{min}$ and $SOC_{max}$ respectively represent minimum and maximum allowable states of charge for operation of the energy storage system; SOC(t) represents an actual state of charge of the energy storage system; $P_{bamin}$ and $P_{bamax}$ respectively represent minimum and maximum allowable power for operation of the energy storage system, $P_{bamin}<0$, and $P_{bamax}>0$; and $P_{ba}$ represents the actual power of the energy storage system.

9. The lightning strike probability-based coordinated power control method for the energy storage system and the load according to claim 4, wherein
step 4 comprises the following substeps:
step 4.1: determining a possible loss of the system due to the lightning strike when the energy storage system participates in power regulation and the load does not perform power regulation;
step 4.2: determining a possible loss of the energy storage system due to the lightning strike after both the energy storage system and the regulatable load preform power regulation;
step 4.3: determining an optimal power regulation amount ΔP*$_l$ of the load; and
step 4.4: regulating the regulated power of the regulatable load.

10. The lightning strike probability-based coordinated power control method for the energy storage system and the load according to claim 8, wherein
step 4 comprises the following substeps:
step 4.1: determining a possible loss of the system due to the lightning strike when the energy storage system participates in power regulation and the load does not perform power regulation;
step 4.2: determining a possible loss of the energy storage system due to the lightning strike after both the energy storage system and the regulatable load preform power regulation;
step 4.3: determining an optimal power regulation amount ΔP*$_l$ of the load; and
step 4.4: regulating the regulated power of the regulatable load.

11. The lightning strike probability-based coordinated power control method for the energy storage system and the load according to claim 9, wherein
in step 4.1, the possible loss of the system due to the lightning strike when the energy storage system participates in power regulation and the load does not perform power regulation satisfies the following relational expression:

$$X_1 = (P_{load} - P_{ba}^*) \times \text{price} \times p_{lightning} \times \Delta T$$

wherein $P_{load}$ represents the power loss caused to the load by the lightning strike, which is in units of kW; price represents the unit price of the lost electric quantity, which is in units of Yuan/kWh; and P*$_{ba}$ represents the optimal output power of the energy storage system.

12. The lightning strike probability-based coordinated power control method for the energy storage system and the load according to claim 10, wherein
in step 4.1, the possible loss of the system due to the lightning strike when the energy storage system participates in power regulation and the load does not perform power regulation satisfies the following relational expression:

$$X_1 = (P_{load} - P_{ba}^*) \times \text{price} \times p_{lightning} \times \Delta T$$

wherein $P_{load}$ represents the power loss caused to the load by the lightning strike, which is in units of kW; price represents the unit price of the lost electric quantity, which is in units of Yuan/kWh; and P*$_{ba}$ represents the optimal output power of the energy storage system.

13. The lightning strike probability-based coordinated power control method for the energy storage system and the load according to claim 11, wherein
in step 4.2, the possible loss of the energy storage system due to the lightning strike after both the energy storage system and the regulatable load preform power regulation satisfies the following relational expression:

$$X_2 = (P_{load} - P_{ba}^* - \Delta P_l) \times \text{price} \times p_{lightning} \times \Delta T + a_k^-(\Delta P_l)^2 + b_k^- \Delta P_l - b_k^- \Delta P_l \vartheta_k^-,$$

wherein $\Delta P_l$ represents a power regulation amount of the load.

14. The lightning strike probability-based coordinated power control method for the energy storage system and the load according to claim 12, wherein
in step 4.2, the possible loss of the energy storage system due to the lightning strike after both the energy storage system and the regulatable load preform power regulation satisfies the following relational expression:

$$X_2 = (P_{load} - P_{ba}^* - \Delta P_l) \times \text{price} \times p_{lightning} \times \Delta T + a_k^-(\Delta P_l)^2 + b_k^- \Delta P_l - b_k^- \Delta P_l \vartheta_k^-,$$

wherein $\Delta P_l$ represents a power regulation amount of the load.

15. The lightning strike probability-based coordinated power control method for the energy storage system and the load according to claim 13, wherein
in step 4.3, a function of a difference between the possible loss due to the lightning strike when the regulatable load does not perform regulation and the possible loss due to the lightning strike after the regulatable load performs regulation satisfies the following relational expression:

$$\Delta X = X_2 - X_1 = a_k^-(\Delta P_l)^2 + (b_k^- - b_k^- \vartheta_k^- - \text{price} \times p_{lightning} \times \Delta T)\Delta P_l$$

wherein $a_k^-$ represents the quadratic term coefficient of the compensation cost caused by decreasing the power of the regulatable load;
$b_k^-$ represents the single term coefficient of the compensation cost caused by decreasing the power of the regulatable load;
$\vartheta_k^-$ represents the parameter indicating the willingness of the user for load adjustment when the power of the regulatable load is decreased; and
based on the function of the difference between the possible loss due to the lightning strike when the regulatable load does not perform regulation and the possible loss due to the lightning strike after the regulatable load performs regulation, the optimal power regulation amount $\Delta P^*_l$ of the load can be obtained and is expressed as follows:

$$\Delta P_l^* = \frac{b_k^- \vartheta_k^- + \text{price} \times p_{lightning} \times \Delta T - b_k^-}{2a_k^-}.$$

16. The lightning strike probability-based coordinated power control method for the energy storage system and the load according to claim 14, wherein
in step 4.3, a function of a difference between the possible loss due to the lightning strike when the regulatable load does not perform regulation and the possible loss due to the lightning strike after the regulatable load performs regulation satisfies the following relational expression:

$$\Delta X = X_2 - X_1 = a_k^-(\Delta P_l)^2 + (b_k^- - b_k^- \vartheta_k^- - \text{price} \times p_{lightning} \times \Delta T)\Delta P_l$$

wherein $a_k^-$ represents the quadratic term coefficient of the compensation cost caused by decreasing the power of the regulatable load;
$b_k^-$ represents the single term coefficient of the compensation cost caused by decreasing the power of the regulatable load;
$\vartheta_k^-$ represents the parameter indicating the willingness of the user for load adjustment when the power of the regulatable load is decreased; and
based on the function of the difference between the possible loss due to the lightning strike when the regulatable load does not perform regulation and the possible loss due to the lightning strike after the regulatable load performs regulation, the optimal power regulation amount $\Delta P^*_l$ of the load can be obtained and is expressed as follows:

$$\Delta P_l^* = \frac{b_k^- \vartheta_k^- + \text{price} \times p_{lightning} \times \Delta T - b_k^-}{2a_k^-}.$$

17. The lightning strike probability-based coordinated power control method for the energy storage system and the load according to claim 15, wherein
in step 4.4, a method for regulating the regulated power of the regulatable load is as follows:
setting a maximum power regulation amount of the load to $\Delta P_{lmax}$; and
if $\Delta P^*_l \leq \Delta P_{lmax}$, determining that the regulated power of the regulatable load is $\Delta P^*_l$; or
if $\Delta P^*_l > \Delta P_{lmax}$, determining that the regulated power of the regulatable load is $\Delta P_{lmax}$.

18. The lightning strike probability-based coordinated power control method for the energy storage system and the load according to claim 16, wherein
in step 4.4, a method for regulating the regulated power of the regulatable load is as follows:
setting a maximum power regulation amount of the load to $\Delta P_{lmax}$; and
if $\Delta P^*_l \leq \Delta P_{lmax}$, determining that the regulated power of the regulatable load is $\Delta P^*_l$; or
if $\Delta P^*_l > \Delta P_{lmax}$, determining that the regulated power of the regulatable load is $\Delta P_{lmax}$.

* * * * *